US010482256B2

(12) United States Patent
Hayashi et al.

(10) Patent No.: US 10,482,256 B2
(45) Date of Patent: Nov. 19, 2019

(54) INFORMATION PROCESSING APPARATUS AND METHOD OF CONTROLLING THE APPARATUS

(71) Applicant: CANON KABUSHIKI KAISHA, Tokyo (JP)

(72) Inventors: Junichi Hayashi, Kamakura (JP); Koji Harada, Fuchu (JP); Nobuhiro Tagashira, Sagamihara (JP); Takami Eguchi, Tokyo (JP); Yasuhiro Nakamoto, Kawasaki (JP); Kazuya Kishi, Kawasaki (JP); Ayuta Kawazu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 15/082,891

(22) Filed: Mar. 28, 2016

(65) Prior Publication Data
US 2016/0292422 A1 Oct. 6, 2016

(30) Foreign Application Priority Data

Mar. 31, 2015 (JP) ................. 2015-072865

(51) Int. Cl.
*G06F 21/57* (2013.01)
*G06F 9/4401* (2018.01)
*G06F 21/52* (2013.01)

(52) U.S. Cl.
CPC .......... *G06F 21/575* (2013.01); *G06F 9/4403* (2013.01); *G06F 21/52* (2013.01); *G06F 21/57* (2013.01); *G06F 2221/033* (2013.01)

(58) Field of Classification Search
CPC ........ G06F 21/575; G06F 21/57; G06F 21/52; G06F 9/4403; G06F 2221/033
See application file for complete search history.

(56) References Cited

U.S. PATENT DOCUMENTS

| 2006/0085630 | A1  |  4/2006 | Challener et al. |
| 2011/0154010 | A1  |  6/2011 | Springfield et al. |
| 2011/0238967 | A1* |  9/2011 | Challener ............... G06F 9/52 713/1 |
| 2012/0110644 | A1  |  5/2012 | Thom et al. |
| 2014/0068276 | A1* |  3/2014 | Imamoto ............... G06F 21/602 713/192 |

FOREIGN PATENT DOCUMENTS

| CN | 101473329 A | 7/2009 |
| CN | 102509046 A | 6/2012 |
| CN | 103597493 A | 2/2014 |
| JP | 2009187134 A | 8/2009 |

* cited by examiner

*Primary Examiner* — Austin Hicks
(74) *Attorney, Agent, or Firm* — Canon U.S.A., Inc. IP Division

(57) ABSTRACT

An information processing apparatus holding a secure chip includes a determination unit that determines whether the information processing apparatus returns from an idle state; a detection unit that, if the determination unit determines that the information processing apparatus returns from the idle state, detects initialization of the secure chip before starting application software; and a control unit that, if the detection unit detects the initialization of the secure chip, controls an operation of the information processing apparatus so that a hash value of the application software is not registered in the secure chip that is initialized.

10 Claims, 20 Drawing Sheets

FIG. 2B

| | PCR | | | | | NvRAM | | | | | |
|---|---|---|---|---|---|---|---|---|---|---|---|
| | 1 | 2 | 3 | 4 | 5 | 1 | 2 | 3 | 4 | 5 | |
| BEFORE START OF INFORMATION PROCESSING APPARATUS  29 ~ | 0 | 0 | 0 | 0 | 0 | 0 | 0 | 0 | 0 | 0 | ~ 210 |
| AFTER MEASUREMENT AND REGISTRATION OF BIOS  211 ~ | H1 | 0 | 0 | 0 | 0 | 0 | 0 | 0 | 0 | 0 | ~ 212 |
| AFTER MEASUREMENT AND REGISTRATION OF BOOT LOADER  213 ~ | H1 | H2 | 0 | 0 | 0 | 0 | 0 | 0 | 0 | 0 | ~ 214 |
| AFTER MEASUREMENT AND REGISTRATION OF OS  215 ~ | H1 | H2 | H3 | 0 | 0 | 0 | 0 | 0 | 0 | 0 | ~ 216 |
| AFTER MEASUREMENT AND REGISTRATION OF APPLICATION 17  217 ~ | H1 | H2 | H3 | H4 | 0 | 0 | 0 | 0 | 0 | 0 | ~ 218 |

FIG. 6B

|  | | PCR | | | | | NvRAM | | | | |
|---|---|---|---|---|---|---|---|---|---|---|---|
|  | | 1 | 2 | 3 | 4 | 5 | 1 | 2 | 3 | 4 | 5 |
| IDLE STATE | 414 | 0 | 0 | 0 | 0 | 0 | 0 | 0 | 0 | 0 | 0 | 415 |
| AFTER READING OUT OF STATE OF PCR | 416 | 0 | 0 | 0 | 0 | 0 | 0 | 0 | 0 | 0 | 0 | 417 |
| AFTER REGISTRATION OF CERTAIN VALUE A IN PCR | 62 | R1 | R2 | R3 | R4 | R5 | 0 | 0 | 0 | 0 | 0 |
| AFTER EXECUTION OF FIRST PROGRAM | 63 | R1 | R2 | R3 | R4 | R5' | 0 | 0 | 0 | 0 | 0 |

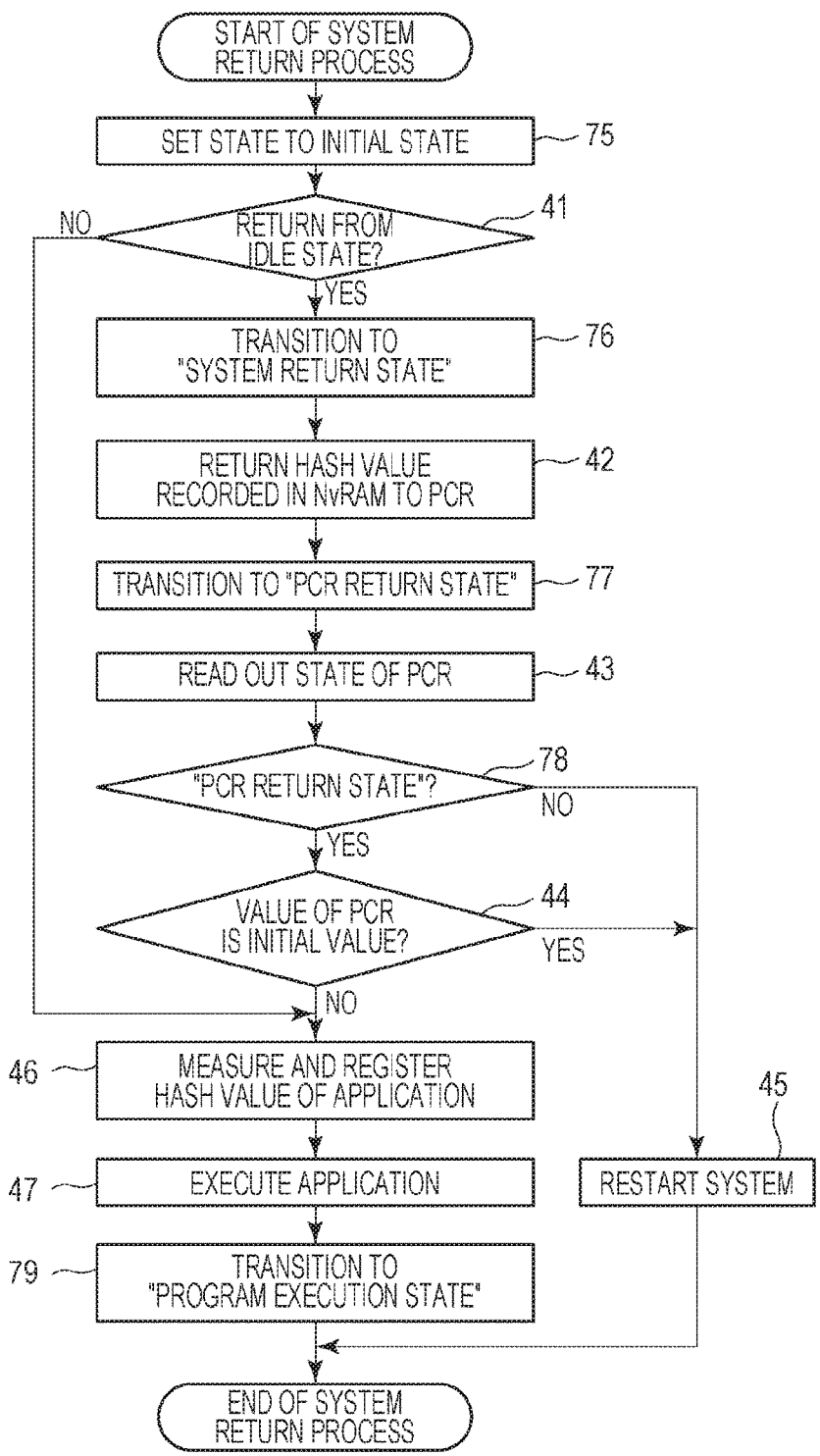

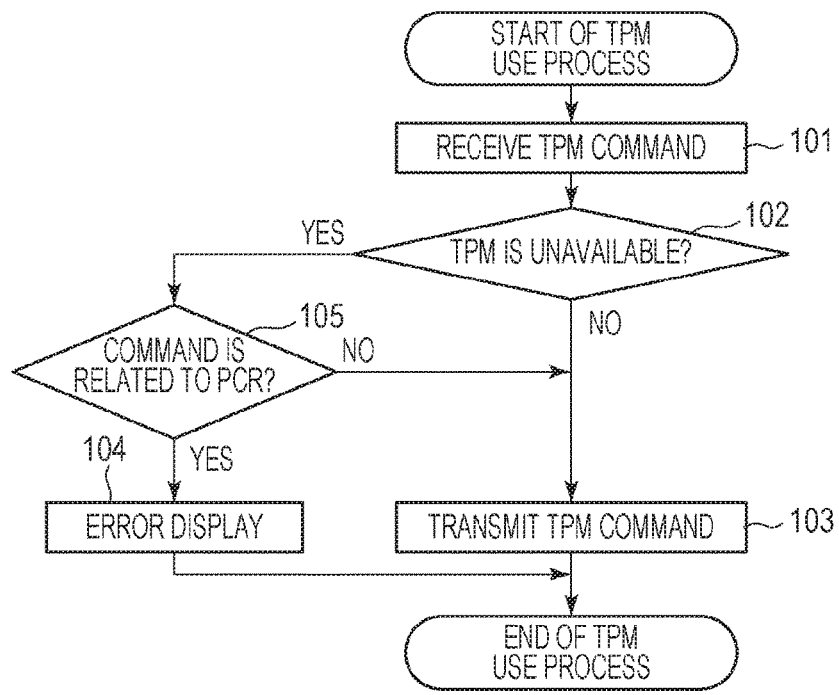

INFORMATION PROCESSING APPARATUS AND METHOD OF CONTROLLING THE APPARATUS

BACKGROUND OF THE INVENTION

Field of the Invention

The present invention relates to an information processing apparatus holding a secure chip and a method of controlling the information processing apparatus.

Description of the Related Art

Detection of tampering of computer programs running on computers using secure chips is proposed. A trusted platform module (TPM) including a volatile memory and a non-volatile memory is exemplified as a general secure chip.

For example, after starting a computer, hash values of computer programs executed by the central processing unit (CPU) of the computer are sequentially registered in the volatile memory in the TPM. The computer programs include a boot loader, an operating system (OS), and application software. After the registration, the hash values recalculated from a computer program that is being executed are compared with the hash values registered in the volatile memory in the TPM to detect whether the computer program is tampered.

A technology is also proposed to detect tampering of data in the memory in the computer in return from an idle state, for example, in a power saving mode.

Since power supply to the TPM is stopped when the computer enters the idle state in the power saving mode, the hash values registered in the volatile memory in the TPM disappear. Accordingly, when the computer returns from the idle state, the hash values registered in the volatile memory in the TPM have already disappeared. Since the detection of tampering is unavailable when the hash values have disappeared, the following measures are taken in the TPM.

The TPM saves the hash values registered in the volatile memory in the TPM in the non-volatile memory before transition to the idle state. The power supply is stopped after the saving. After returning from the idle state, the hash values saved in the non-volatile memory are restored in the volatile memory.

Japanese Patent Laid-Open No. 2009-187134 discloses a technology concerning the saving of the hash values. Specifically, the hash values in a snapshot of the memory before the computer is changed to the idle state are stored in the non-volatile memory in the TPM. Then, when the computer returns from the idle state, the hash values recalculated from the snapshot are compared with the hash values stored in the non-volatile memory.

However, when the CPU executes application software after the TPM saves the hash values registered in the volatile memory in the non-volatile memory, the hash values of the application software are registered in the volatile memory again.

In other words, the content of the non-volatile memory does not coincide with the content of the volatile memory at this time. In order to prevent an occurrence of the inconsistency between the contents of the memories, the content of the non-volatile memory is initialized in the TPM when the hash values are registered in the volatile memory after the content of the volatile memory has been saved in the non-volatile memory.

When the non-volatile memory is initialized before the transition to the idle state, initial values are restored in the volatile memory when the computer returns from the idle state. In this state, it is not possible to detect whether the application software that is being started is tampered. In addition, when the hash values of application software that is newly started is to be registered, the hash values are registered in a state in which the hash values of other software, such as the boot loader or the OS, are not registered. When the detection of tampering is performed in the state in which the hash values of other software, such as the boot loader or the OS, are not registered, it is determined that the tampering is performed.

The present invention provides an information processing apparatus holding a secure chip, which is capable of preventing an occurrence of any problem when the hash value of application software is registered in the secure chip after the information processing apparatus returns from the idle state.

SUMMARY OF THE INVENTION

The present invention provides an information processing apparatus holding a secure chip in which a hash value is capable of being registered includes a determination unit that determines whether the information processing apparatus returns from an idle state; a detection unit that, if the determination unit determines that the information processing apparatus returns from the idle state, detects initialization of the secure chip before starting application software; and a control unit that, if the detection unit detects the initialization of the secure chip, controls an operation of the information processing apparatus so that the hash value of the application software is not registered in the secure chip that is initialized.

Further features of the present invention will become apparent from the following description of exemplary embodiments with reference to the attached drawings.

BRIEF DESCRIPTION OF THE DRAWINGS

FIGS. 2A and 2B include diagrams for describing a booting process in the first embodiment;

FIGS. 6A and 6B include diagrams for describing a system return process in a fourth embodiment;

FIGS. 7A and 7B include diagrams for describing a system return process in a fifth embodiment;

FIGS. 10A to 10C include diagrams for describing a TPM use process in a third embodiment.

DESCRIPTION OF THE EMBODIMENTS

Embodiments

First Embodiment

<Hardware Configuration of Information Processing Apparatus>

Figure 1:
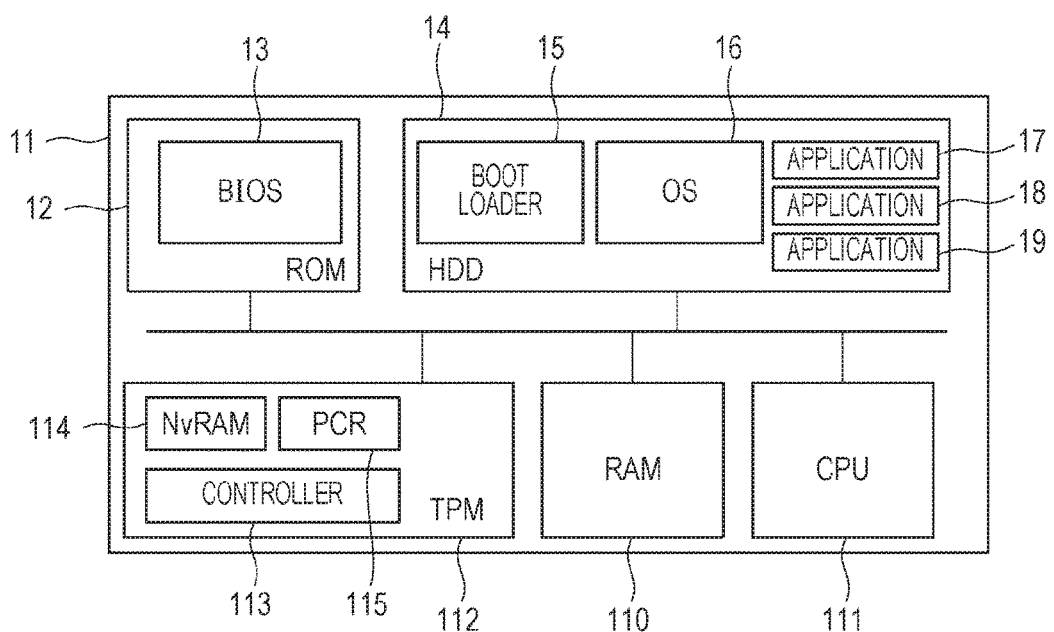
FIG. 1 is a block diagram illustrating an exemplary basic hardware configuration of an information processing apparatus according to a first embodiment.

An exemplary hardware configuration of an information processing apparatus applicable to a first embodiment will now be described with reference to FIG. 1. FIG. 1 is a block diagram illustrating an exemplary basic hardware configuration of the information processing apparatus according to the first embodiment. Referring to FIG. 1, an information processing apparatus 11 is, for example, a personal computer or an information mobile terminal, which is in widespread use, an image processing apparatus capable of copying, scanning, and printing of image data, or an imaging apparatus capable of taking a digital photo.

As illustrated in FIG. 1, the information processing apparatus 11 in the first embodiment includes a read only memory (ROM) 12, a hard disk drive (HDD) 14, a random access memory (RAM) 110, a CPU 111, and a TPM 112.

The ROM 12 is a non-volatile memory capable of physical or logical rewriting and is an auxiliary storage unit capable of storing a Basic Input/Output System (BIOS) 13, various programs (not illustrated), and data. The BIOS 13 is a program that controls the entire information processing apparatus 11. The BIOS 13 is a computer program that is first started in the information processing apparatus 11 when power is applied to the information processing apparatus 11.

The HDD 14 is an auxiliary storage unit capable of storing a boot loader 15, an OS 16, an application 17, an application 18, an application 19, and a variety of data. The boot loader 15 performs control including specification and start of the OS that should be started next. The OS 16 is a program that controls loading of various applications, management of the RAM 110, and an input-output function including a keyboard (not illustrated) and screen output. Each of the application 17, the application 18, and the application 19 is, for example, an address book, a mailer, a word processor, a spreadsheet, a database manager, or a network browser. Alternately, each of the application 17, the application 18, and the application 19 may be a program (application software) that provides operations, such as video and/or audio playback, printing, and communication, which a user of the information processing apparatus 11 wants to perform as functions. Although the example in which the three applications are installed in the information processing apparatus 11 is described in the first embodiment, the first embodiment is not limited to this. Applications of an arbitrary number may be installed in the information processing apparatus 11.

The RAM 110 is a volatile memory. The RAM 110 is a main storage unit that temporarily stores programs and a variety of data (operation state) in order to perform processing in the CPU 111.

The CPU 111 is an electronic circuit capable of controlling the operation of each component in the information processing apparatus 11 or executing the programs loaded in the RAM 110.

The TPM 112 is a secure chip having tamper resistance. The tamper resistance is a feature to make external analysis difficult and to perform self-defense by destroying programs or data stored in the TPM 112 when the external analysis is attempted. The TPM 112 includes a controller 113, an NvRAM 114, and a platform configuration register (PCR) 115.

The controller 113 performs, for example, registration of a hash value in the PCR 115, generation of a digital signature, and encryption and decryption described below. The NvRAM 114 is a non-volatile memory and stores a secret key necessary for generating the digital signature, an encryption key necessary for the encryption and decryption, and so on, in addition to the hash value described below. The PCR 115 is a volatile memory (register) and stores a value based on a hash value of a program executed in the information processing apparatus 11. The program is any of the BIOS 13, the boot loader 15, the OS 16, the application 17, the application 18, and the application 19 described above in the following description.

In the information processing apparatus 11 in the first embodiment, power supply to the TPM 112 is stopped in an idle state described below. In other words, since the NvRAM 114 in the TPM 112 is a non-volatile memory, the data in the NvRAM 114 is held also in the idle state. In contrast, since the PCR 115 is a volatile memory, the information in the PCR 115 is discarded (initialized to an initial value) when the information processing apparatus 11 enters the idle state. It should be noted that the data held in the PCR 115 before the information processing apparatus 11 is changed to the idle state is not held in the PCR 115 after the information processing apparatus 11 returns from the idle state.

The hardware configuration of the information processing apparatus in the first embodiment has been described above.

<Booting Process Flow>

A booting process in the first embodiment will now be described in detail with reference to FIG. 2A. The following flow is performed in the information processing apparatus 11 described above and each step in the flow is realized by the corresponding program and the CPU 111 that executes the program.

Figure 2A:
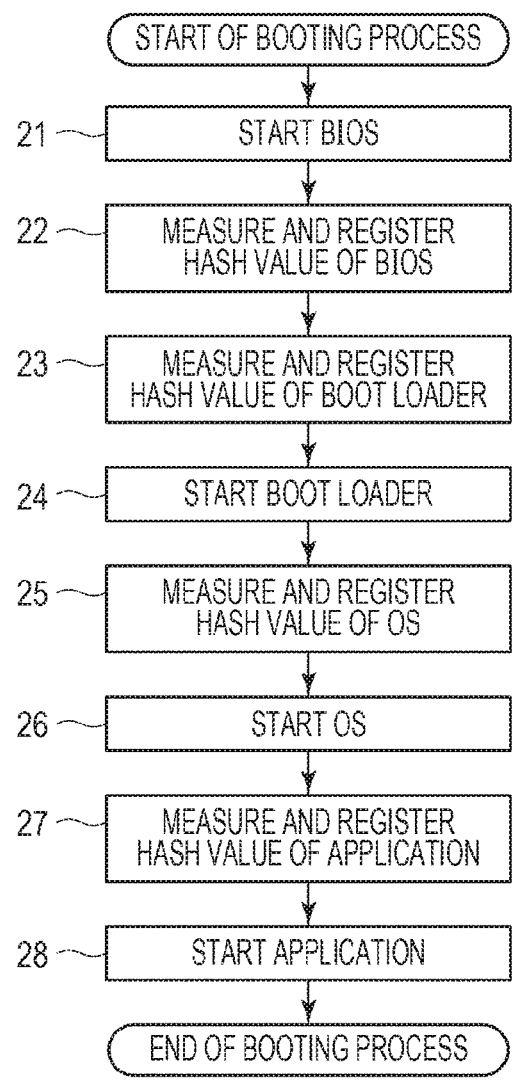

FIG. 2A is a flowchart illustrating an exemplary booting process applicable to the first embodiment.

Upon application of power to the information processing apparatus 11, in Step 21, the BIOS 13 is started. In Step 22, the BIOS 13 measures the hash value of the BIOS 13 and registers the measured hash value in the TPM 112.

The measurement process and the registration process in the first embodiment will now be described. The measurement process is a process to calculate the hash value of program code to be measured. In the first embodiment, a hash function to calculate the hash value is not specially limited and various known hash functions including SHA1, SHA256, and SHA512 are applicable. Alternatively, an arbitrary function is applicable as long as a feature value with which a program to be measured is capable of being uniquely identified is calculated using the function.

The registration process is a process to transmit the hash value calculated through the measurement process to the TPM 112 and record a value calculated in the TPM 112 according to Equation (1) on the PCR 115:

$$\text{DATA\_}i+1 = H(\text{DATA\_}i | \text{INPUT}) \qquad (1)$$

In Equation (1), INPUT is a hash value input from the outside of the TPM 112 and DATA_i is a value that has been recorded on the PCR 115 in the registration in the TPM 112. In addition, "x|y" indicates connection between a value x and a value y. Furthermore, DATA_i+1 is a result that is calculated when the value INPUT is input from the outside of the TPM 112. In other words, when INPUT is input into the TPM 112, DATA_i+1 is recorded on the PCR 115 in the TPM 112.

It is assumed in the first embodiment that the initial value (DATA_0) of the PCR when i=0 is equal to zero ("0"). However, the first embodiment is not limited to this and the initial value of the PCR may be an arbitrary constant other than zero.

In the first embodiment, the PCR 115 is composed of five storage areas and each storage area is capable of being identified with an identifier (ID). FIG. 2B illustrates an exemplary structure of the PCR in the first embodiment. As illustrated by reference numeral 29 in FIG. 2B, the PCR in the first embodiment includes five areas identified with IDs 1 to 5. Although the example in which the PCR includes the five areas is described in the first embodiment, the first embodiment is not limited to this. The PCR may include areas of an arbitrary number.

Reference numeral 29 in FIG. 2B indicates the state of the PCR before the information processing apparatus 11 is started. In other words, the initial value "0" is stored in each area of the PCR, as described above. In contrast, reference numeral 211 in FIG. 2B indicates the state of the PCR after the measurement process and the registration process of the BIOS in Step 22. As indicated by reference numeral 211, DATA_1 is calculated according to Equation (1) using the hash value of the BIOS as INPUT and the result of the calculation is recorded on a PCR1 as H1. The PCR1 is a storage area having ID=1 of the PCR. A PCRn (n=1 to 5) indicates a storage area having ID=n of the PCR in the following description.

Referring back to FIG. 2A, in Step 23, the BIOS 13 measures the hash value of the boot loader 15 and registers the measured hash value in the TPM 112. Since the measurement process and the registration process of the boot loader in Step 23 is the same as that of the BIOS in Step 22, a detailed description is omitted herein. A value calculated according to Equation (1) using the hash value of the boot loader 15 as INPUT is registered in the PCR2 as H2 in Step 23. Reference numeral 213 in FIG. 2B indicates the state of the PCR after the measurement process and the registration process of the boot loader in Step 23. In Step 24, the BIOS 13 starts the boot loader 15.

In Step 25, the boot loader 15 measures the hash value of the OS 16 and registers the measured hash value in the TPM 112. Since the measurement process and the registration process of the OS in Step 25 is the same as in Step 22 and Step 23, a detailed description is omitted herein. A value calculated according to Equation (1) using the hash value of the OS 16 as INPUT is registered in the PCR3 as H3 in Step 25. Reference numeral 215 in FIG. 2B indicates the state of the PCR after the measurement process and the registration process of the OS in Step 25.

In Step 26, the boot loader 15 starts the OS 16. In Step 27, the OS 16 measures the hash value of the application 17 and registers the measured hash value in the TPM 112. Since the measurement process and the registration process of the application in Step 27 is the same as the measurement processes and the registration processes described above, a detailed description is omitted herein. A value calculated according to Equation (1) using the hash value of the application 17 as INPUT is registered in the PCR4 as H4 in Step 27. Reference numeral 217 in FIG. 2B indicates the state of the PCR after the measurement process and the registration process of the application in Step 27.

Although only application 17 is started in the booting process in the first embodiment, the first embodiment is not limited to this. Applications of an arbitrary number may be started.

In Step 28, the OS 16 starts the application 17.

The flowchart of the booting process in the first embodiment has been described. As described above, upon application of power to the information processing apparatus 11, the programs of the BIOS 13, the boot loader 15, the OS 16, and the application 17 are sequentially started. In the series of the steps in the booting process, the hash values of the respective programs are sequentially recorded on the PCR and, upon completion of the booting process of the information processing apparatus 11, the PCR is in the state illustrated by reference numeral 217 in FIG. 2B. In other words, upon completion of the booting process, the hash values of all the programs executed in the information processing apparatus 11 are recorded on the PCR.

Reference numerals 210, 212, 214, 216, and 218 in FIG. 2B indicate the states of the NvRAM 114 in the TPM 112. In the first embodiment, the NvRAM 114 is also composed of five storage areas, as in the PCR 115, and each storage area is capable of being identified with its ID. Although the example in which the NvRAM includes the five areas is described in the first embodiment, the first embodiment is not limited to this. The NvRAM may include areas of an arbitrary number. Since no value is recorded on the NvRAM 114 in the booting process in the first embodiment, the initial value "0" is registered in the states 210, 212, 214, 216, and 218 in FIG. 2B.

The booting process described above allows the hash values registered in the PCR 115 to be used in a data use restriction process and a tampering detection process described below.

<Idle State Transition Process>

An idle state transition process in the first embodiment will now be described in detail with reference to FIG. 3A. The following flow is performed in the information processing apparatus 11 described above and each step in the flow is realized by the corresponding program and the CPU 111 that executes the program.

Figure 3A:
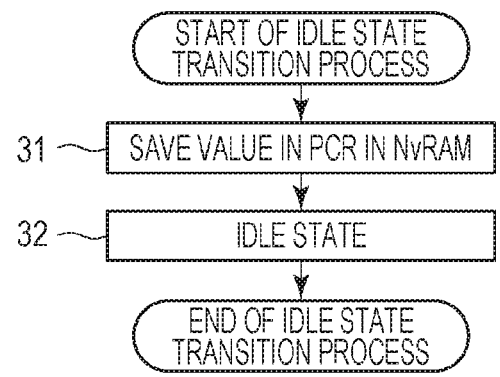
FIGS. 3A to 3D include diagrams for describing an idle state transition process in the first embodiment.

FIG. 3A is a flowchart illustrating an exemplary idle state transition process applicable to the first embodiment.

In response to an instruction to perform the idle state transition process to the information processing apparatus 11 by the user of the information processing apparatus 11 with a keyboard, a mouse, and/or buttons (not illustrated), the idle state transition process is started. Alternatively, when any operation for the information processing apparatus 11 does not occur for a certain time, the information processing apparatus 11 may automatically start the idle state transition process.

Figure 3B:
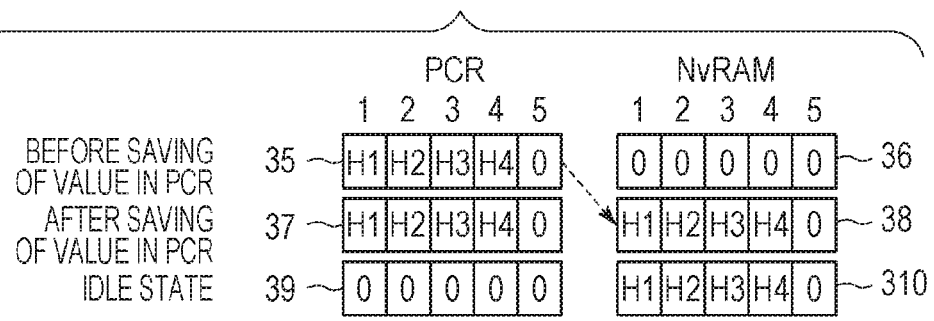

At start of the idle state transition process, in Step 31, the value in the PCR 115 in the TPM 112 is saved in the NvRAM 114. Step 31 will be described in detail with reference to FIG. 3B. Reference numerals 35 and 36 in FIG. 3B indicate the states of the PCR 115 and the NvRAM 114, respectively, before the value in the PCR 115 is saved in the NvRAM 114 in Step 31. The states indicated by reference numeral 35 and 36 are the same as the states indicated by reference numeral 217 and 218 in FIG. 2B. The hash values held in the PCR 115 are copied to the NvRAM 114 in Step 31. As a result, the NvRAM 114 is in a state indicated by reference numeral 38 in FIG. 3B after the saving of the values in the PCR. In contrast, the internal state of the PCR 115 is not changed in Step 31. Accordingly, a state indicated by reference numeral 37 in FIG. 3B is the same as the state indicated by reference numeral 35.

After the saving of the values in the PCR in Step 31, in Step 32, the information processing apparatus 11 is changed to the idle state. Although the power supply to the RAM 110 in the information processing apparatus 11 is continued in the idle state in the first embodiment, the power supply to the TPM 112 is stopped. As described above, since the PCR 115 in the TPM 112 is a volatile memory, the hash values in the PCR 115 are discarded and are initialized to the initial value "0" when the information processing apparatus 11 is changed to the idle state in Step 32. Reference numeral 39 in FIG. 3B indicates the state of the PCR 115 in the idle state. Since the power supply to the TPM 112 is stopped in the idle state, the PCR 115 is initialized to the initial value "0".

In contrast, since the NvRAM 114 in the TPM 112 is a non-volatile memory, the hash values in the NvRAM 114 are continuously kept even when the information processing apparatus 11 enters the idle state in Step 32. Reference numeral 310 in FIG. 3B indicates the state of the NvRAM 114 in the idle state.

In the first embodiment, a flag indicating whether the information processing apparatus 11 is in the idle state is recorded on the HDD 14 in order to determine whether the information processing apparatus 11 is in a system return state in a system return process described below.

The idle state transition process in the first embodiment has been described.

The information processing apparatus 11 is changed to the idle state in Step 32 immediately after the value in the PCR 115 is saved in the NvRAM 114 in Step 31 in the idle state transition process illustrated in FIG. 3A. However, the first embodiment is not limited to this. An application may be started after the value in the PCR 115 is saved in the NvRAM 114 in Step 31. Although such a situation is not originally supposed, the situation may occur in the case of an application having a high execution priority or in a case in which an application is unintentionally started due to, for example, interruption into the system. Alternatively, malware may intentionally start after the value in the PCR 115 is saved in the NvRAM 114 in Step 31.

An idle state transition process when an application is started after the value in the PCR 115 is saved in the NvRAM 114 in Step 31 will now be described with reference to FIG. 3C. The following flow is performed in the information processing apparatus 11 described above and each step in the flow is realized by the corresponding program and the CPU 111 that executes the program.

Figure 3C:
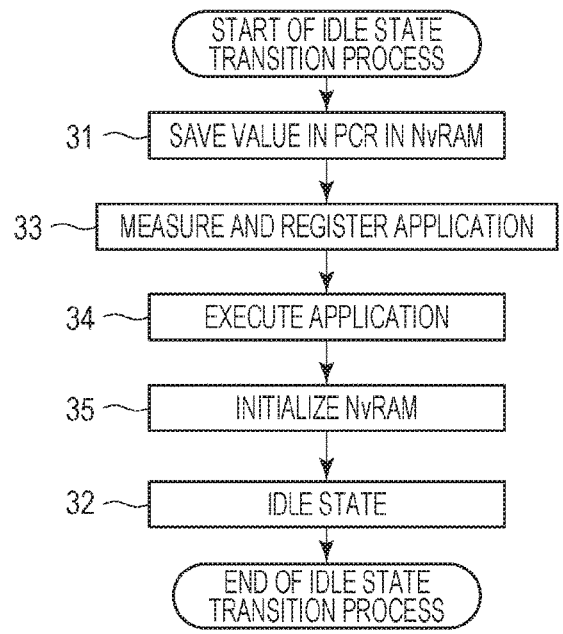
Figure 3D:
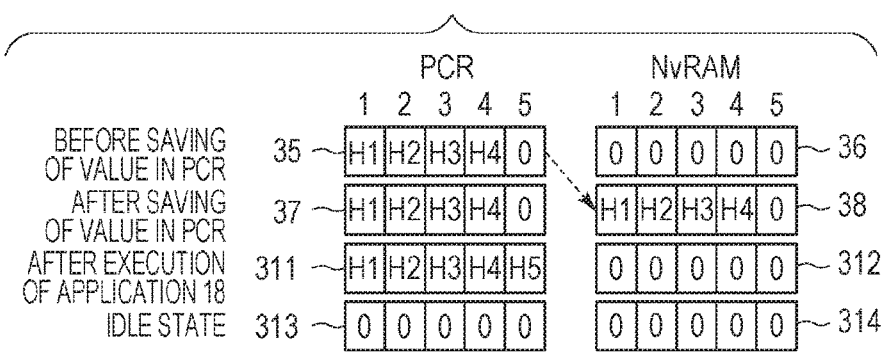

FIG. 3C is a flowchart illustrating an exemplary idle state transition process applicable to the first embodiment. The same step numbers are added to the same steps in FIG. 3A and FIG. 3C and a detailed description of such steps is omitted herein. FIG. 3D illustrates how the states of the PCR 115 and the NvRAM 114 are varied in the idle state transition process. The same reference numerals are added to the same states in FIG. 3B and FIG. 3D and a detailed description of such states is omitted herein.

Referring to FIG. 3C, after the value in the PCR 115 is saved in the NvRAM 114 in Step 31, in Step 33, the measurement process and the registration process of the application 18 is performed. A value calculated according to Equation (1) using the hash value of the application 18 as INPUT is registered in the PCR5 as H5 in Step 33. After the measurement process and the registration process of the application 18, in Step 34, the application 18 is executed.

Reference numeral 311 in FIG. 3D indicates the state of the PCR after the measurement process and the registration process of the application 18 in Step 33. It is noted that the value of the PCR5 in the state 38 of the NvRAM 114 is different from that in the state 311 after the measurement process and the registration process of the application 18 at this time. Although this will be described in detail in the system return process described below, the hash values (the state 38) saved in the NvRAM 114 at this stage are restored in the PCR 115 after the system return. In this case, the state (the state 311) of the PCR 115 before the information processing apparatus 11 is changed to the idle state does not coincide with the state of the PCR 115 after the information processing apparatus 11 returns from the idle state. In other words, the hash value of the application 18 executed in Step 34 is not reflected in the PCR 115 after the information processing apparatus 11 returns from the idle state.

In order to avoid the above situation, in the first embodiment, in Step 35, the NvRAM 114 is initialized. The state of the NvRAM 114 after the NvRAM 114 is initialized to the initial value "0" in Step 35 is indicated by reference numeral 312 in FIG. 3D.

After the NvRAM 114 is initialized in Step 35, in Step 32, the information processing apparatus 11 is changed to the idle state. The states of the PCR 115 and the NvRAM 114 after the information processing apparatus 11 is changed to the idle state are indicated by reference numerals 313 and 314, respectively, in FIG. 3D. Since the power supply to the TPM 112 is stopped, the PCR 115, which is a volatile memory, is initialized. In contrast, the NvRAM 114 is kept in the state initialized in Step 35.

As described above, the PCR 115 in the information processing apparatus 11 in the idle state has the initial value in the first embodiment. In contrast, the NvRAM 114 has the hash values recorded thereon, as in the state 310 in FIG. 3B, or is initialized, as in the state 314 in FIG. 3D.

Figure 11:
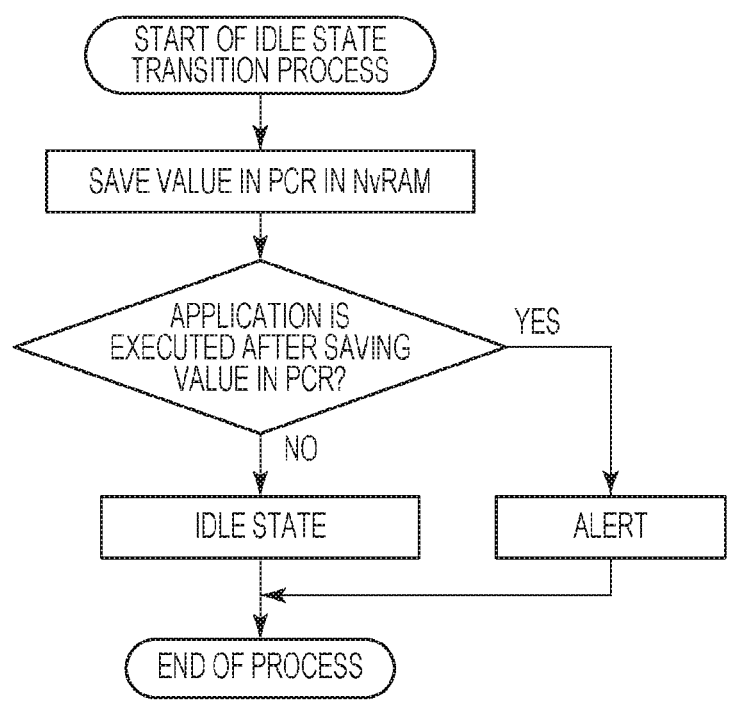
FIG. 11 is a diagram for describing another idle state transition process in the first embodiment.

When the information processing apparatus 11 performs the transition process to the idle state, it may be determined whether an application is executed after the saving of the values in the PCR. FIG. 11 is a flowchart illustrating an idle state transition process including a step of determining whether an application is executed after the saving of the values in the PCR. As illustrated in FIG. 11, when an application is executed after the saving of the values in the PCR, the information processing apparatus 11 is prevented from entering the idle state and a notification is given to the user, for example, an alert is issued to the user on a monitor. This prevents the information processing apparatus 11 from being changed to the idle state in the state in which the NvRAM 114 is initialized.

The idle state transition processes in the first embodiment have been described.

<System Return Process>

The system return process in the first embodiment will now be described in detail with reference to FIG. 4A. The following flow is performed in the information processing apparatus 11 described above and each step in the flow is realized by the corresponding program and the CPU 111 that executes the program.

Figure 4A:
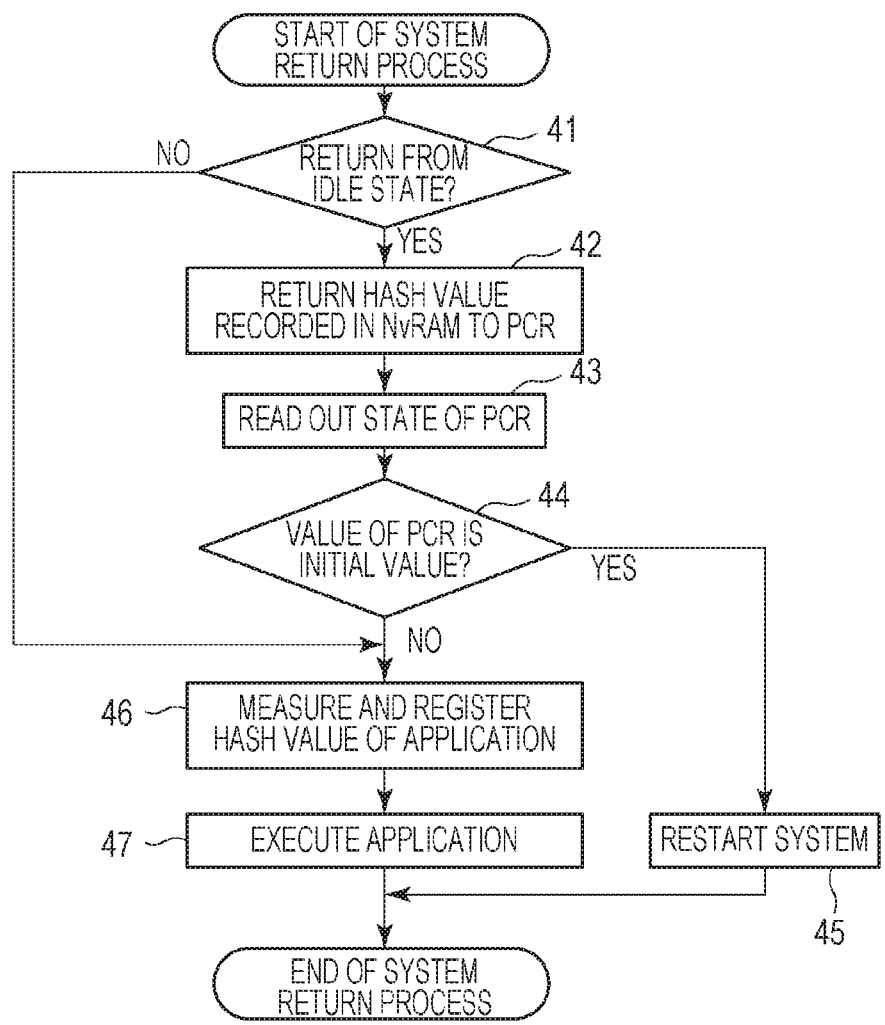
FIGS. 4A to 4C include diagrams for describing a system return process in the first embodiment.

FIG. 4A is a flowchart illustrating an exemplary system return process applicable to the first embodiment. In response to an instruction to perform the system return process to the information processing apparatus 11, which is in the idle state through the idle state transition process described above with reference to FIG. 3A or FIG. 3C, by the user of the information processing apparatus 11 with the keyboard, the mouse, and/or the buttons (not illustrated), the system return process is started.

Referring to FIG. 4A, in Step 41, it is determined whether the information processing apparatus 11 returns from the idle state. This determination is based on the flag recorded on the HDD 14 in Step 32 in FIG. 3A or FIG. 3C. The process goes to Step 42 if the flag indicates that the information processing apparatus 11 returns from the idle state (YES in Step 41) and otherwise (NO in Step 41) goes to Step 46.

In Step 42, the hash value recorded on the NvRAM 114 is returned to the PCR 115 (hereinafter referred to as a PCR return process). The PCR return process in the first embodiment will now be described with reference to FIG. 4B and FIG. 4C. Reference numerals 48 and 49 in FIG. 4B indicate the states of the PCR 115 and the NvRAM 114, respectively, after the idle state transition process illustrated in FIG. 3A. The states 48 and 49 correspond to the states 39 and 310 in FIG. 3B.

Figure 4B:
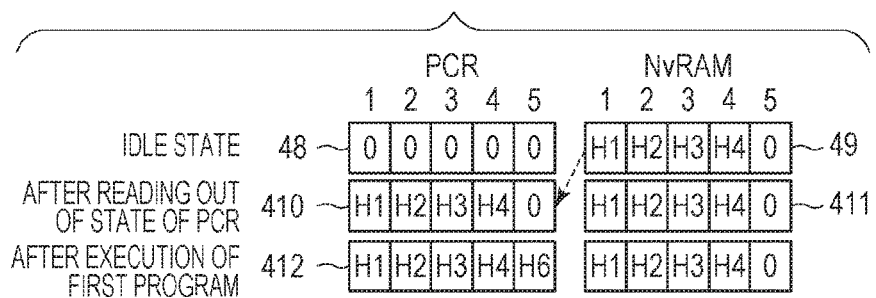
Figure 4C:
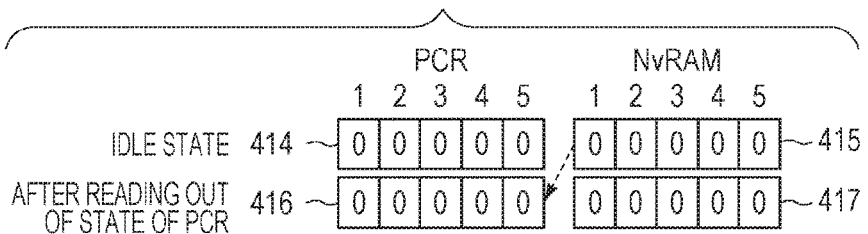

Reference numerals 414 and 415 in FIG. 4C indicate the states of the PCR 115 and the NvRAM 114, respectively after the idle state transition process illustrated in FIG. 3C. The states 414 and 415 correspond to the states 313 and 314 in FIG. 3D.

After the PCR return process in Step 42, in the case in FIG. 4B, the state 49 of the NvRAM 114 is copied to the PCR 115 and the PCR 115 is in a state 410. In the case in FIG. 4C, the state 415 of the NvRAM 114 is copied to the PCR 115 and the PCR 115 is in a state 416. The state of the NvRAM 114 is not changed after the PCR return process in Step 42. Accordingly, the state 49 in FIG. 4B is kept in a state 411 and the state 415 in FIG. 4C is kept in a state 417.

After the PCR return process in Step 42, in Step 43, the state of the PCR is read out. In the first embodiment, the state 410 in FIG. 4B or the state 416 in FIG. 4C is read out in Step 43.

In Step 44, it is determined whether the PCR has the initial value. The process goes to Step 45 if the PCR has the initial value (YES in Step 44) and otherwise (NO in Step 44) goes to Step 46.

In response to an instruction to execute application 19 by the user of the information processing apparatus 11 with the mouse, the keyboard, and/or the buttons (not illustrated), in Step 46, the hash value of the application 19 is measured and the measured hash value is registered in the TPM 112. Since the measurement and the registration of the application 19 in Step 46 are performed in the same manner as in the measurement and the registration described above, a detailed description of them is omitted herein. A value calculated according to Equation (1) using the hash value of the application 19 as INPUT is registered in the PCR5 as H6 in Step 46. Reference numeral 412 in FIG. 4B indicates the state of the PCR 115 after the measurement and the registration of the application 19 in Step 46. In step 47, the application 19 is executed.

Only the application 19 is executed in the first embodiment, the first embodiment is not limited to this. Applications of an arbitrary number may be executed. In this case, Step 46 and Step 47 are repeated.

In Step 45, the information processing apparatus 11 is restarted. The restart causes the booting process (FIG. 2A) to be performed again. Since the series of programs including the BIOS, the boot loader, the OS, and the applications are re-measured and the re-measured values are re-registered in the PCR 115 in the booting process in FIG. 2A, the valid state of the PCR 115, which does not have the initial value, is restored.

The timing of the confirmation of whether the PCR 115 has the initial value in Step 44 is very important. If Step 44 is performed before the PCR return process in Step 42, the validity of the PCR 115 is not correctly determined. This is because the PCR 115 has the initial value at any time before the PCR return process.

In addition, also if Step 44 is performed after the application 19 is measured and registered in Step 46, the validity of the PCR 115 is not correctly determined. This is because the value of the PCR 115 is updated on the basis of Equation (1) through the measurement and the registration of the application 19.

Accordingly, as described in the first embodiment, performing Step 44 after the PCR return process from the NvRAM 114 in Step 42 and before the measurement and the registration of the application in Step 46 allows the validity of the PCR 115 to be correctly determined.

The confirmation of the value of the PCR in Step 44 only when the information processing apparatus 11 returns from the idle state in Step 41 is also very important. If Step 44 is performed not in the system return process from the idle state (FIG. 4A) but in the normal booting process (FIG. 2A), the validity of the PCR 115 is not correctly determined. This is because the PCR 115 has the initial value before the normal booting process.

As described in the first embodiment, performing Step 44 only when it is determined in Step 41 that the system return process is the return process from the idle state allows the validity of the PCR 115 to be correctly determined.

The system return process in the first embodiment has been described.

Second Embodiment

The information processing apparatus 11 is forced to be restarted in Step 45 if it is determined that the PCR has the initial value in Step 44 in the system return process in the first embodiment. However, it is not necessary to force the information processing apparatus 11 to be restarted and functional reduction may be performed so as to continue the use of the information processing apparatus 11 and deactivate only the TPM 112. In a second embodiment, a system return process when the functional reduction is performed so as to deactivate the TPM 112 will be described.

Figure 5A:
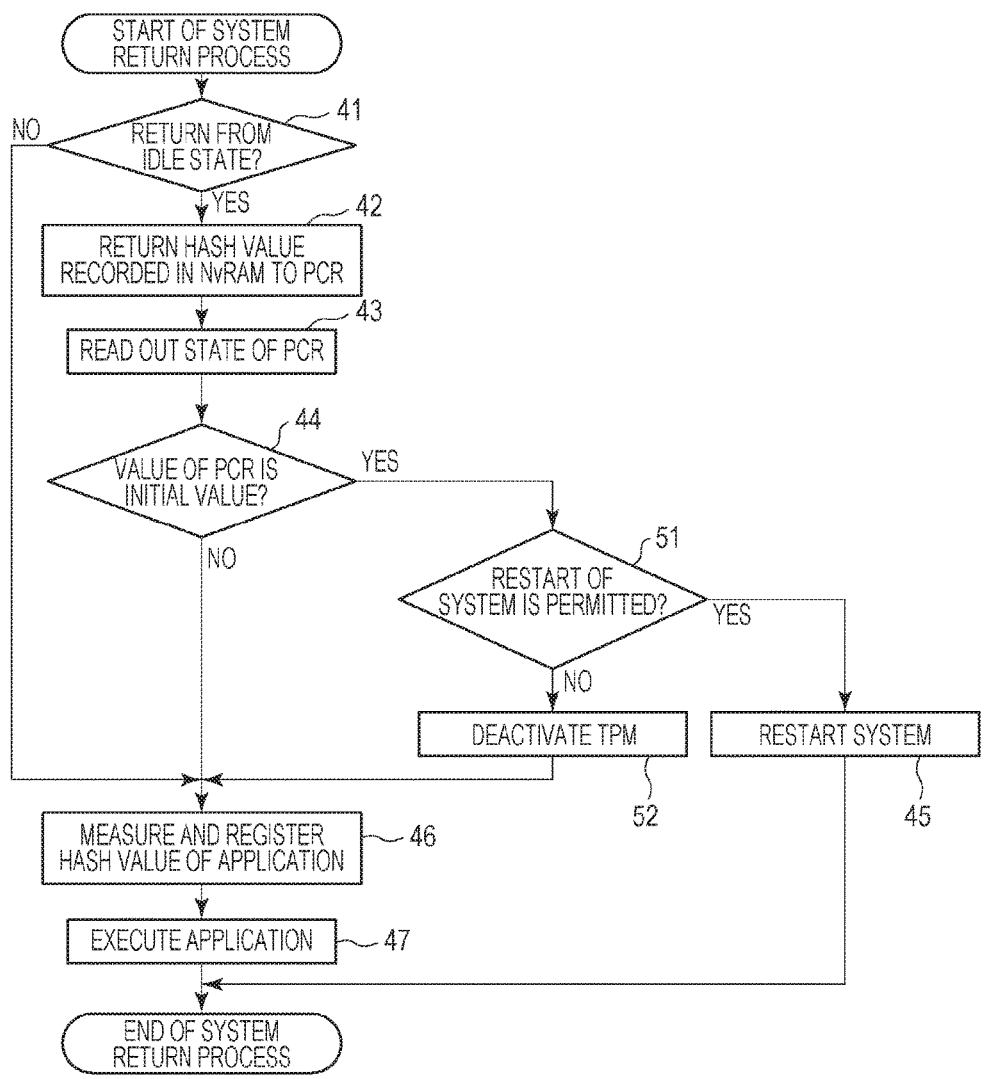
FIGS. 5A and 5B include diagrams for describing a system return process in a second embodiment.

FIG. 5A is a flowchart illustrating an exemplary system return process in the second embodiment. The same step numbers are added to the same steps in FIG. 4A and FIG. 5A and a detailed description of such steps is omitted herein. Only the steps different from those in FIG. 4A are described below with reference to FIG. 5A.

Referring to FIG. 5A, if it is determined in Step 44 that the PCR 115 has the initial value (YES in Step 44), the process goes to Step 51. In Step 51, the user of the information processing apparatus 11 is inquired of whether the information processing apparatus 11 is to be restarted using a screen (not illustrated) provided in the information processing apparatus 11. The user of the information processing apparatus 11 selects permission or non-permission of the restart of the information processing apparatus 11 with the mouse, the keyboard, and/or the buttons. The process goes to Step 45 if the restart of the information processing apparatus 11 is permitted (YES in Step 51) and otherwise (NO in Step 51) goes to Step 52.

In Step 52, the TPM 112 is controlled so as to be temporarily deactivated. In the second embodiment, a command (for example, TPM_SetTempDeactivated) to temporarily deactivate the TPM 112 is transmitted to the TPM 112. This command sets the TPM 112 to a deactivated mode and any command from the outside of the TPM 112 is not accepted in the deactivated mode. Accordingly, since the TPM 112 is deactivated when the TPM 112 is attempted to be used from the outside of the TPM 112, the functional reduction is realized.

The second embodiment is not limited to this and various methods to deactivate the TPM 112 are applicable. For example, a lot of incorrect passwords or authentication codes may be transmitted to the TPM 112 to set the TPM 112 in a locked state. Since the TPM 112 in the locked state also does not accept any command from the outside, the functional reduction is realized.

Figure 5B:
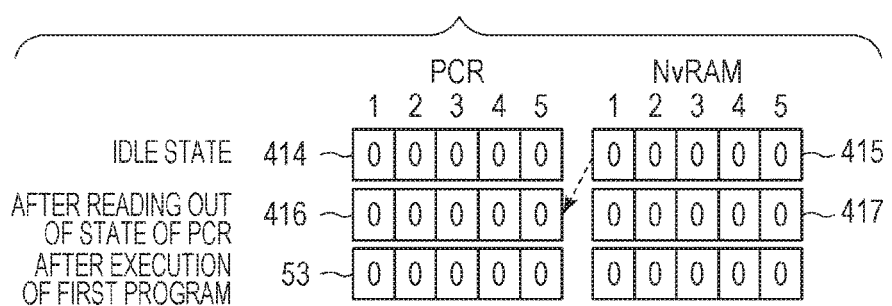

After Step 52, the process goes to Step 46. If the hash value of the application is to be registered in the TPM 112 in Step 46 when the TPM 112 is deactivated in Step 52, the registration is unavailable. In other words, a state 53 of the PCR 115 after the measurement and the registration of the application 19 is not changed from the state 416 before the measurement and the registration, as illustrated in FIG. 5B.

Since the TPM 112 has been deactivated in Step 52 also when the TPM 112 is used in a data use process and an integrity report generation process described below, the data use process and the integrity report generation process are not capable of being performed. In any case, the functional reduction is realized in which only the TPM 112 is deactivated while the use of the information processing apparatus 11 is continued.

The system return process in the second embodiment has been described.

Third Embodiment

The TPM 112 itself is deactivated in Step 52 in FIG. 5A in the system return process in the second embodiment. Specifically, a command to temporarily deactivate the TPM 112 is transmitted or incorrect passwords or authentication codes are transmitted to set the TPM 112 to the locked state. However, the second embodiment is not limited to this. Control may be performed so as to make the TPM 112 unavailable from the information processing apparatus 11, instead of the deactivation of the TPM 112 itself in Step 52.

In order to perform the control so as to make the TPM 112 unavailable from the information processing apparatus 11, the TPM 112 may be made unavailable in a device driver for using the TPM 112 from the information processing apparatus 11. Specifically, in Step 52, a flag indicating whether the TPM 112 is made unavailable is set in, for example, the HDD 14 or the NvRAM 114. Then, access to the TPM 112 is controlled in accordance with the flag when a program in the information processing apparatus 11 is to use the information processing apparatus 11 using the device driver.

An exemplary TPM use process in a third embodiment will now be described with reference to FIG. 10A. When the user of the information processing apparatus 11 is to use the TPM 112 with the keyboard, the mouse, and/or the buttons (not illustrated) in the information processing apparatus 11 subjected to the system return process in FIG. 5A, the TPM use process in FIG. 10A is started in the device driver.

Figure 10A:
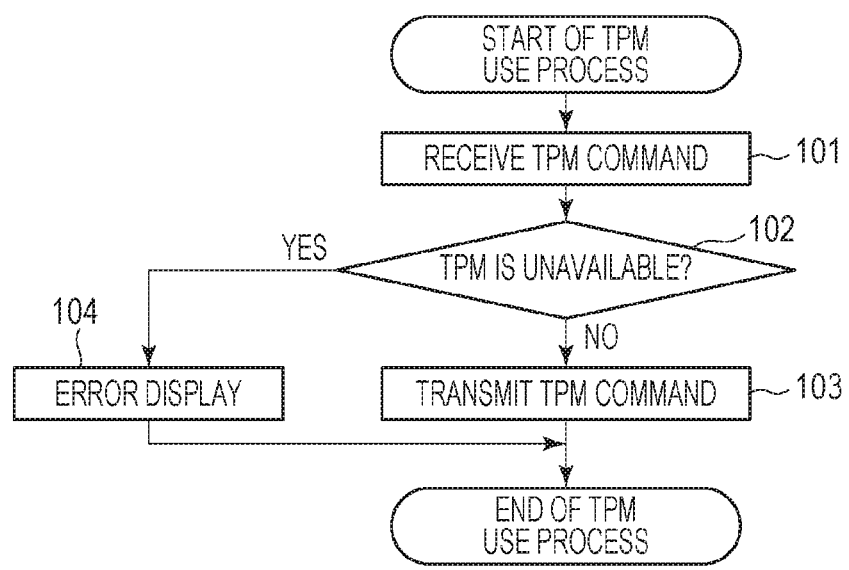

Referring to FIG. 10A, in Step 101, a TPM command is received from the program. In Step 102, the flag indicating whether the TPM 112 is made unavailable is confirmed. The process goes to Step 104 if the flag indicates that the TPM 112 is made unavailable (YES in Step 102) and otherwise (NO in Step 102) goes to Step 103. In Step 103, the TPM command received in Step 101 is transmitted to the TPM 112. In Step 104, an error message indicating that the TPM 112 is made unavailable is displayed in, for example, a monitor (not illustrated) of the information processing apparatus 11.

The TPM 112 may be made unavailable from the information processing apparatus 11 through the TPM use process described above, instead of the deactivation of the TPM 112 itself.

The control is performed so as to constantly make the TPM 112 unavailable when the flag indicating that the TPM 112 is made unavailable is set in the TPM use process in FIG. 10A. However, the third embodiment is not limited to this and control of the use of the TPM 112 may be performed in accordance with the TPM command to be executed. A TPM use process in this case will now be described with reference to FIG. 10B.

The same step numbers are added to the same steps in FIG. 10A and FIG. 10B and a detailed description of such steps is omitted herein.

Referring to FIG. 10B, if it is determined in Step 102 that the TPM 112 is made unavailable (YES in Step 102), in Step 105, it is determined whether the TPM command to be executed is related to the PCR. The process goes to Step 104 if the TPM command to be executed is related to the PCR (YES in Step 105) and otherwise (NO Step 105) goes to Step 103.

A table indicating whether the TPM command is related to the PCR is prepared in advance and the determination is performed with reference to the table in Step 105. FIG. 10C illustrates an example of the table. In the example of the table illustrated in FIG. 10C, a circle (◯) is added to each command related to the PCR and a cross (x) is added to each command that is not related to the PCR. In the third embodiment, the command related to the PCR is a command to access (read or write) the PCR in the TPM 112 when the TPM command is executed in the TPM 112. In the example illustrated in FIG. 10C, three commands: TPM_Seal, TPM_Quote, and TPM_Bind access the PCR when the commands are executed in the TPM 112. In contrast, three commands: TPM_GetRandom, TPM_GetTicks, and TPM_Sign are executed without access to the PCR.

Through the TPM use process described above, the use of the command that is not related to the PCR is permitted even if the flag indicating that the TPM 112 is made unavailable is set.

The third embodiment is not limited to the above ones and the TPM 112 may be made unavailable from the information processing apparatus 11 using various methods. For example, a device file name for using the TPM 112 may be changed. For example, when the device file name is "/dev/tpm", this device file name is changed to "/dev/tpm.deny" in Step 52. In this case, since the device file "/dev/tpm" does not exist when the program in the information processing apparatus 11 is to use the TPM 112 via the device file /dev/tpm, the TPM 112 is unavailable.

As described above, the TPM 112 may be made unavailable from the information processing apparatus 11 by restricting the access to the TPM 112, instead of the deactivation of the TPM 112 itself.

Fourth Embodiment

The information processing apparatus 11 is not necessarily forced to be restarted if it is determined in Step 44 that the PCR 115 has the initial value in the system return process described above with reference to FIG. 5A. Restricting the use of the TPM 112 allows the information processing apparatus 11 to be continuously used. However, the second embodiment is not limited to this. If the value of the PCR 115 is not correct (the PCR 115 has the initial value) in the system return, the use of data may be prohibited in the subsequent data use restriction process described below. Similarly, if the value of the PCR 115 is not correct (the PCR 115 has the initial value) in the system return, it may be determined to be "verification failure" in the subsequent tampering detection process described below. A system return process in this case will be described in a fourth embodiment.

Figure 6A:
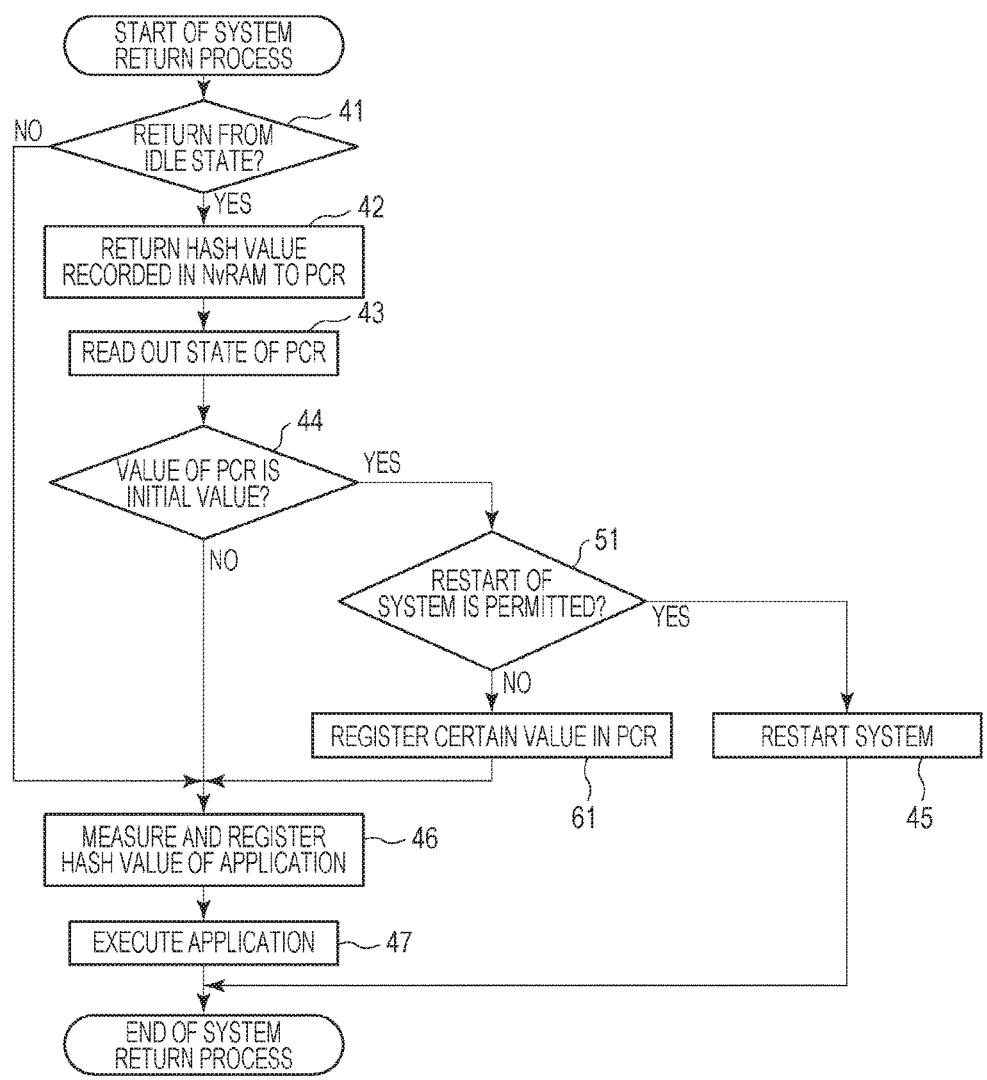

FIG. 6A is a flowchart illustrating an exemplary system return process in the fourth embodiment. The same step numbers are added to the same steps in FIG. 4A, FIG. 5A, and FIG. 6A and a detailed description of such steps is omitted herein. Only the steps different from those in FIG. 4A and FIG. 5A are described below with reference to FIG. 6A.

Referring to FIG. 6A, if the restart of the information processing apparatus 11 is not permitted (NO in Step 51), the process goes to Step 61.

In Step 61, a certain value is registered in the PCR 115. In the fourth embodiment, values "PCR1→A1, PCR2→A2, PCR3→A3, PCR4→A4, and PCR→A5" are registered in the individual storage areas in the PCR 115 as INPUT in Equation (1). "PCR1→A1" means that the value A1 is registered in the PCR1. Each of the values A1, A2, A3, A4, and A5 is "a constant indicating that the PCR has the initial value in the system return."

Although the different values (A1, A2, A3, A4, and A5) are input into the five individual storage areas in the PCR 115 in the fourth embodiment, the fourth embodiment is not limited to this. The same value (for example, A1) may be registered in the individual storage areas. The values A1, A2, A3, A4, and A5 are preferably predetermined constants. Alternatively, different pseudo random numbers may be generated each time Step 61 is performed and the generated pseudo random numbers may be registered.

The state of the PCR 115 after a certain value is registered in the PCR 115 in Step 61 is indicated by reference numeral 62 in FIG. 6B. For example, R1 registered in the PCR1 in the state 62 is calculated according to Equation (1) using A1 as INPUT.

After Step 61, the process goes to Step 46. In Step 46, a value calculated according to Equation (1) using the hash value of the application 19 as INPUT is registered in the PCR5, as described above. A value R5' registered in the PCR5 in a state 63 is calculated according to Equation (1) using the hash value of the application 19 as INPUT.

The system return process in the fourth embodiment has been described.

According to the fourth embodiment, when the PCR has the initial value after the system return, the constant indicating that the PCR has the initial value in the system return" is registered in the PCR. Accordingly, since a PCR condition in encrypted data does not coincide with the value of the PCR in the TPM 112 in the data use restriction process described below, it is possible to prohibit use of the encrypted data. Similarly, since the value of the PCR in an integrity report is not registered as a PCR expectation value in the tampering detection process described below, it is determined to be "verification failure."

Fifth Embodiment

It has been described that the timing of the confirmation of whether the PCR 115 has the initial value in Step 44 is very important in the system return process described above with reference to FIG. 4A. In other words, performing Step 44 after the PCR return process from the NvRAM 114 in Step 42 and before the measurement and the registration in Step 46 allows the validity of the PCR 115 to be correctly confirmed. A fifth embodiment in which the confirmation of the value of the PCR 115 is made more reliably at right timing will now be described.

Figure 7A:
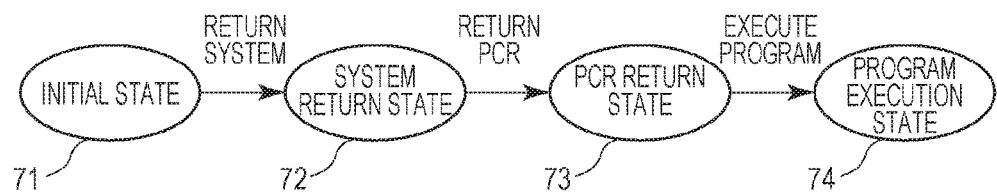

FIG. 7A is a diagram for describing state transition in the fifth embodiment. FIG. 7B is a flowchart illustrating an exemplary system return process in the fifth embodiment. The same step numbers are added to the same steps in FIG. 4A and FIG. 7B and a detailed description of such steps is omitted herein. Only the steps different from those in FIG. 4A are described in FIG. 7B with reference to the state transition illustrated in FIG. 7A.

Referring to FIG. 7B, at start of the system return process, in Step 75, the state of the information processing apparatus 11 is set to an initial state. In the fifth embodiment, a flag indicating the state is held in the HDD 14. At this time, the information processing apparatus 11 is in a state 71 illustrated in FIG. 7A.

If it is determined in Step 41 that the information processing apparatus 11 returns from the idle state (YES in Step 41), in Step 76, the state of the information processing apparatus 11 is changed to the "system return state." At this time, the information processing apparatus 11 is in a state 72 illustrated in FIG. 7A.

After the PCR return process from the NvRAM 114 in Step 42, in Step 77, the state of the information processing apparatus 11 is changed to a "PCR return state." At this time, the information processing apparatus 11 is in a state 73 illustrated in FIG. 7A.

In Step 78, it is determined whether the state of the information processing apparatus 11 is the "PCR return state." The determination may be based on the flag indicating the state, which is held in the HDD 14. The process goes to Step 44 if the flag indicating the state indicates the "PCR return state" (YES in Step 78) and otherwise (NO in Step 78) goes to Step 45.

After the application 19 is executed in Step 47, in Step 79, the state of the information processing apparatus 11 is changed to a "program execution state." At this time, the information processing apparatus 11 is in a state 74 illustrated in FIG. 7A.

The system return process in the fifth embodiment has been described.

According to the fifth embodiment, the state of the series of steps in the system return process is managed to reliably confirm whether the PCR has the initial value in Step 44 in the "PCR return state." The "PCR return state" is a state after the PCR return process from the NvRAM 114 in Step 42 and after the measurement and the registration in Step 46.

<Data Use Restriction Process>

The data use restriction process in the fifth embodiment will now be described in detail with reference to FIG. 8A. The following flow is performed in the information processing apparatus 11 described above and each step in the flow is realized by the corresponding program and the CPU 111 that executes the program.

Figure 8A:
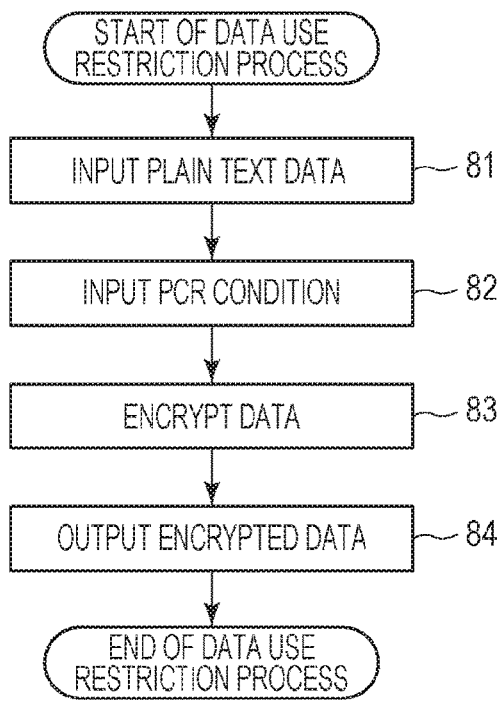
FIGS. 8A to 8C include diagrams for describing a data use restriction process and a data use process in the fifth embodiment.

FIG. 8A is a flowchart illustrating an exemplary data use restriction process applicable to the fifth embodiment.

The data use restriction process is performed in response to an instruction to perform the data use restriction process to the information processing apparatus 11 by the user of the information processing apparatus 11 with the keyboard, the mouse, and/or the buttons (not illustrated).

At start of the data use restriction process, in Step 81, plain text data to be subjected to the data use restriction process is input. A variety of data including image data, document data, and music data is capable of being input as the plain text data. Data held in the HDD 14 in the information processing apparatus 11 in advance may be input. Alternatively, data may be input from the outside of the information processing apparatus 11 via an interface (communication or a medium) (not illustrated).

In Step 82, a PCR condition that makes the plain text data available is input. The PCR condition in the fifth embodiment is a condition indicating which state the PCR 115 in the TPM 112 is in when the plain text data is made available. In the fifth embodiment, the state of the PCR 115 after the BIOS 13, the boot loader 15, the OS 16, and the application 17 are started in the booting process in FIG. 2A described above is specified as the PCR condition. The PCR condition in this state is "PCR1=H1, PCR2=H2, PCR3=H3, and PCR4=H4."

The fifth embodiment is not limited to this and various states of the PCR 115 may be specified as the PCR condition.

In Step 83, the plain text data input in Step 81 is encrypted. An encryption algorithm for the encryption is not specifically limited in the fifth embodiment and various encryption algorithms, such as symmetric-key encryption including Advanced Encryption Standard (AES), Data Encryption Standard (DES), and Triple DES (3DES) or public-key encryption including Rivest-Shamir-Adleman (RSA) algorithm, ElGamal encryption, and elliptic curve cryptography, may be applicable. The encryption key used for the encryption is held in the TPM 112.

Figure 8B:
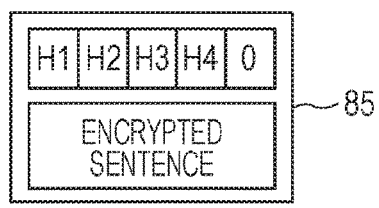

In Step 84, the encrypted data is output. In the fifth embodiment, the PCR condition input in Step 82 is added to the encrypted data generated in Step 83 to output the result of the addition as the encrypted data. Reference numeral 85 in FIG. 8B illustrates an example of the encrypted data in the first embodiment.

The data use restriction process in the fifth embodiment has been described.

<Data Use Process>

The data use process in the fifth embodiment will now be described in detail with reference to FIG. 8C. The following flow is performed in the information processing apparatus 11 described above and each step in the flow is realized by the corresponding program and the CPU 111 that executes the program.

Figure 8C:
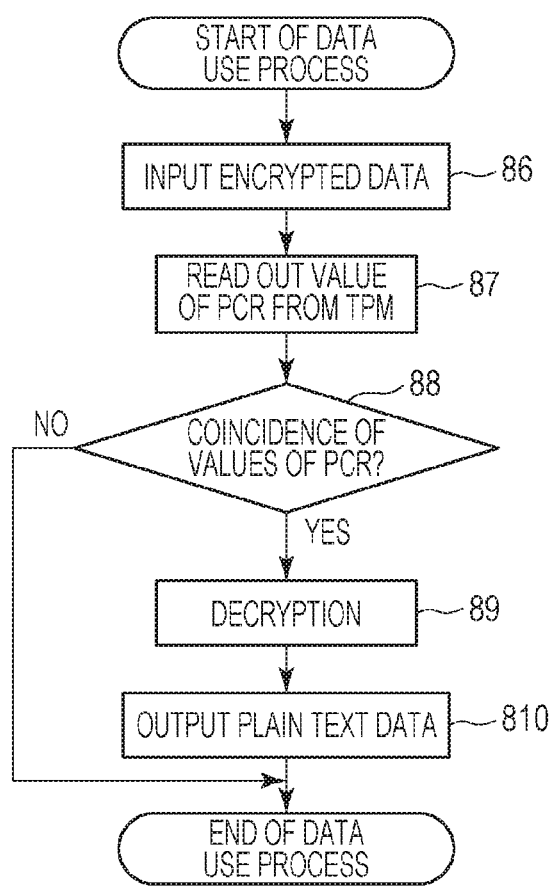

FIG. 8C is a flowchart illustrating an exemplary data use process applicable to the fifth embodiment.

The data use process is performed in response to an instruction to perform the data use process to the information processing apparatus 11 by the user of the information processing apparatus 11 with the keyboard, the mouse, and/or the buttons (not illustrated).

At start of the data use process, in Step 86, the encrypted data to be subjected to the data use process is input. In the fifth embodiment, the encrypted data illustrated by reference numeral 85 in FIG. 8B is input.

In Step 87, the value of the PCR 115 is read out from the TPM 112. An example is described in the following description in which the state 217 illustrated in FIG. 2B is read out when the data use process is performed after the booting process described above with reference to FIG. 2A.

In Step 88, it is determined whether the PCR condition added to the encrypted data 85 input in Step 86 coincides with the value of the PCR read out from the TPM 112 in Step 87. The process goes to Step 89 if the PCR condition added to the encrypted data 85 input in Step 86 coincides with the value of the PCR read out from the TPM 112 in Step 87 (YES in Step 88) and, otherwise (NO in Step 88), the data use process is terminated. If the PCR condition added to the encrypted data 85 input in Step 86 does not coincide with the value of the PCR read out from the TPM 112 in Step 87 (NO in Step 88), an error message indicating that the encrypted data input in Step 86 is unavailable may be displayed. Since the state 217 illustrated in FIG. 2B coincides with the PCR condition illustrated in FIG. 8B in the fifth embodiment, the process goes to Step 89.

In Step 89, the encrypted data is decrypted. The encryption algorithm for the decryption is not specifically limited in the fifth embodiment and various encryption algorithms, such as the symmetric-key encryption including AES, DES, and 3DES or the public-key encryption including RSA algorithm, ElGamal encryption, and elliptic curve cryptography, may be applicable. The encryption key used for the decryption is held in the TPM 112.

In Step 810, the plain text data decrypted in Step 89 is output.

The data use process in the fifth embodiment has been described.

With the data use restriction process and the data use process described above, the data illustrated in FIG. 8B is available when a program that is not tampered is executed in the booting process illustrated in FIG. 2A. In addition, when the TPM is deactivated in Step 52 in the system return process illustrated in FIG. 5A, use of the data illustrated in FIG. 8B is prohibited. Furthermore, also when a certain value is registered in the PCR in Step 61 in the system return process illustrated in FIG. 6A, use of the data illustrated in FIG. 8B is prohibited.

<Tampering Detection System>

The configuration of a tampering detection system in the fifth embodiment will now be described with reference to FIG. 9A.

Figure 9A:
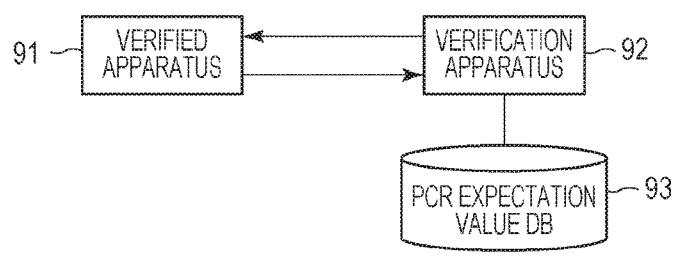
FIGS. 9A to 9D include diagrams for describing a tampering detection process in the fifth embodiment.

FIG. 9A illustrates an outline of a tampering detection system applicable to the fifth embodiment. Referring to FIG. 9A, the tampering detection system in the fifth embodiment includes a verified apparatus 91 and a verification apparatus 92. The verified apparatus 91 is connected to the verification apparatus 92 via a wired or wireless communication line and the verified apparatus 91 and the verification apparatus 92 are capable of exchanging data. The information processing apparatus 11 described above (FIG. 1) is applicable to the verified apparatus 91 and the verification apparatus 92.

In the fifth embodiment, the verification apparatus 92 confirms whether software in the verified apparatus 91 is reliable. This process is called the tampering detection process. In the tampering detection process, an integrity report (described in detail below) is generated from the PCR in the verified apparatus 91 and the generated integrity report is transmitted to the verification apparatus 92. The verification apparatus 92 determines whether the software in the verified apparatus 91 from which the integrity report has been transmitted is tampered using the received integrity report and the expectation values of the hash values, which are registered in an expectation value DB 93 in advance. In the fifth embodiment, H1, H2, H3, H4, and H6, which are the expectation values of the hash values, are registered.

The outline of the tampering detection system applicable to the fifth embodiment has been described.

<Integrity Report Generation Process>

The integrity report generation process in the verified apparatus 91 in the fifth embodiment will now be described with reference to FIG. 9B. The following flow is realized as software in the verified apparatus 91 having the configuration of the information processing apparatus 11 described above and each step in the flow is realized by the corresponding program and the CPU 111 that executes the program.

Figure 9B:
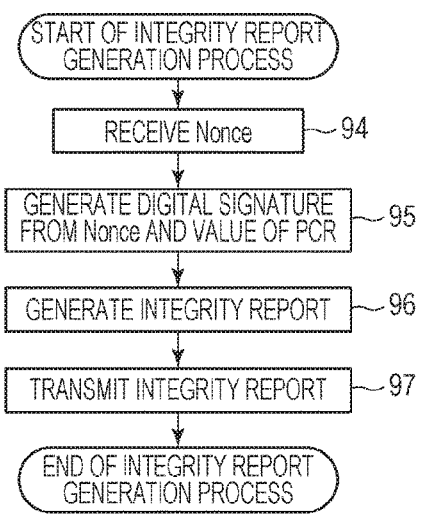

FIG. 9B is a flowchart illustrating an exemplary integrity report generation process applicable to the fifth embodiment.

Referring to FIG. 9B, in Step 94, the verified apparatus 91 receives Nonce from the verification apparatus 92. The verified apparatus 91 receives Nonce transmitted in Step 910 described below. In the fifth embodiment, Nonce uses pseudo random numbers. However, the fifth embodiment is not limited to this and arbitrary data may be used as long as the data have different values, which it is difficult to infer, each time the tampering detection process is performed.

In Step 95, the verified apparatus 91 generates a digital signature from Nonce and the value of the PCR 115 at this time using the TPM 112. The algorithm used for generating the digital signature is not specifically limited and various algorithms including RSA, Digital Signature Algorithm (DSA), and ElGamal encryption may be applicable. The secret key managed in the TPM 112 is applicable to the secret key used for generating the digital signature.

In Step 96, the verified apparatus 91 generates the integrity report from Nonce received in Step 94, the digital signature generated in Step 95, the value of the PCR for which the digital signature is generated in Step 95, and a certificate. A public key corresponding to the secret key described above should be included in the certificate.

Figure 9C:
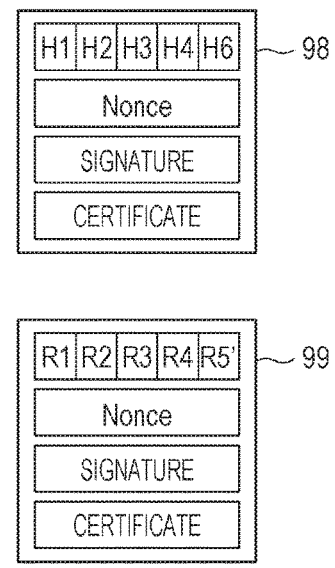

FIG. 9C illustrates examples of the integrity report in the fifth embodiment. Reference numeral 98 in FIG. 9C indicates the integrity report generated from the state 412 in FIG. 4B. Reference numeral 99 in FIG. 9C indicates the integrity report generated from the state 63 in FIG. 6B.

In Step 97, the verified apparatus 91 transmits the integrity report generated in Step 96 to the verification apparatus 92.

The integrity report generation process in the fifth embodiment has been described.

<Integrity Report Verification Process>

An integrity report verification process in the verification apparatus 92 in the fifth embodiment will now be described with reference to FIG. 9D. The following flow is realized as software in the verification apparatus 92 having the configuration of the information processing apparatus 11 described above and each step in the flow is realized by the corresponding program and the CPU 111 that executes the program.

Figure 9D:
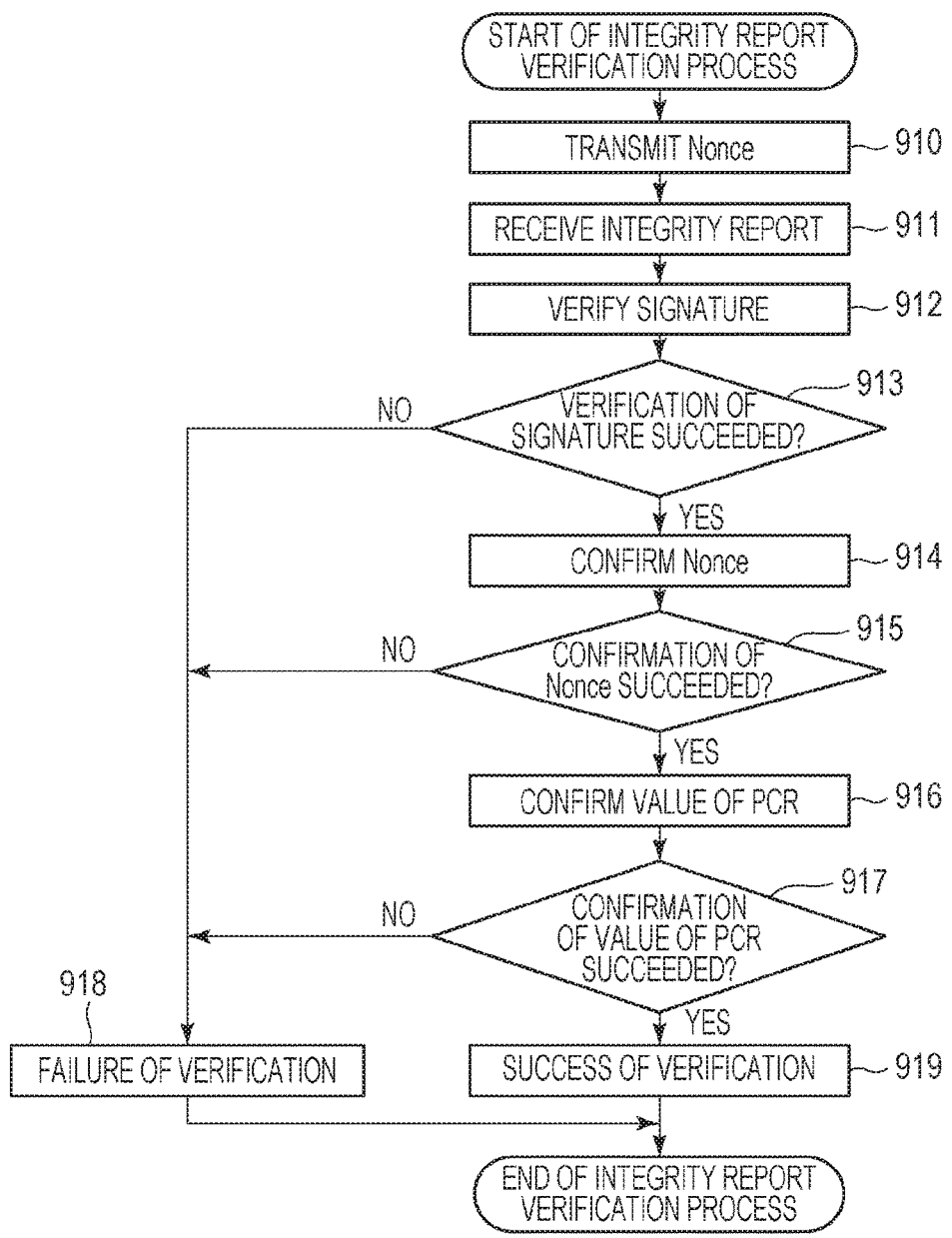

FIG. 9D is a flowchart illustrating an exemplary integrity report verification process applicable to the fifth embodiment.

Referring to FIG. 9D, in Step 910, the verification apparatus 92 transmits Nonce to the verified apparatus 91. Nonce transmitted in Step 910 is received in Step 94 described above. In Step 911, the verification apparatus 92 receives the integrity report from the verified apparatus 91. The integrity report transmitted from the verified apparatus 91 in Step 97 is received in Step 911.

In Step 912, the verification apparatus 92 verifies the signature in the integrity report received in Step 911 using the public key included in the certificate in the integrity report. In Step 913, the verification apparatus 92 confirms whether the verification of the signature succeeded. The process goes to Step 914 if the verification of the signature succeeded (YES in Step 913) and otherwise (NO in Step 913) goes to Step 918.

In Step 914, the verification apparatus 92 confirms the value of Nonce in the integrity report received in Step 911 and the value of Nonce transmitted in Step 910. In Step 915, the verification apparatus 92 confirms whether the value of Nonce in the integrity report received in Step 911 coincides with the value of Nonce transmitted in Step 910. The process goes to Step 916 if the value of Nonce in the integrity report received in Step 911 coincides with the value of Nonce transmitted in Step 910 (YES in Step 915) and otherwise (No in Step 915) goes to Step 918.

In Step 916, the verification apparatus 92 confirms the value of the PCR in the integrity report received in Step 911. In Step 917, the verification apparatus 92 confirms whether the value of the PCR in the integrity report received in Step 911 are included in the expectation value DB 93 in FIG. 9A. The process goes to Step 919 if the value of the PCR in the integrity report received in Step 911 is included in the expectation value DB 93 in FIG. 9A (YES in Step 917) and otherwise (NO in Step 917) goes to Step 918.

For example, since all of H1, H2, H3, H4, and H6 are held in the expectation value DB 93 in the case of the integrity report 98 in FIG. 9C, the verification apparatus 92 determines that the value of the PCR in the integrity report received in Step 911 is included in the expectation value DB 93 in FIG. 9A. In contrast, since none of R1, R2, R3, R4, and R5' is held in the expectation value DB 93 in the case of the integrity report 99 in FIG. 9C, the verification apparatus 92 determines that the value of the PCR in the integrity report received in Step 911 is not included in the expectation value DB 93 in FIG. 9A.

In Step 918, the verification apparatus 92 determines that the verification failed. In this case, it is determined that the program in the verified apparatus 91 is tampered. In contrast, in Step 919, the verification apparatus 92 determines that the verification succeeded. In this case, it is determined that the program in the verified apparatus 91 is not tampered.

The integrity report verification process in the fifth embodiment has been described.

With the tampering detection process described above, if the PCR in the verified apparatus 91 is in the state 412 in FIG. 4B, the integrity report 98 illustrated in FIG. 9C is generated and it is determined that the verification succeeded. In contrast, if the PCR in the verified apparatus 91 is in the state 63 in FIG. 6B, the integrity report 99 illustrated in FIG. 9C is generated and it is determined that the verification failed.

According to the fifth embodiment, it is possible to correctly verify the validity of the value of the PCR after the PCR return process in the system return process (FIG. 4A) regardless of whether the application is executed after the value in the PCR 115 in the TPM 112 is saved in the NvRAM 114 in the idle state transition process (FIG. 3C). If it is determined that the value of the PCR is not valid, the information processing apparatus 11 is restarted to restore the PCR to the correct state again. Only when the value of the PCR is valid, the application is started in the information processing apparatus 11 to perform a desired process.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-072865, filed in Mar. 31, 2015, which is hereby incorporated by reference herein in its entirety.

What is claimed is:

1. An information processing apparatus holding a secure chip in which a hash value is capable of being registered, the information processing apparatus comprising:
    a determination unit configured to determine whether the information processing apparatus returns from an idle state;
    a detection unit configured to, if the determination unit determines that the information processing apparatus returns from the idle state, detect initialization of the secure chip before starting application software; and
    a control unit configured to, if detection of the initialization of the secure chip is done and restart of the information processing apparatus is not permitted, register a constant indicating that a platform configuration register (PCR) has an initial value in system return in the secure chip, and if determination that the information processing apparatus returns from an idle state is not done, control an operation of the information processing apparatus so that the hash value of the application software is registered in the secure chip.

2. The information processing apparatus according to claim 1,
    wherein the secure chip includes a volatile memory in which the hash value of software executed in the information processing apparatus is registered.

3. The information processing apparatus according to claim 1,
    wherein the secure chip is a trusted platform module (TPM).

4. The information processing apparatus according to claim 1,
    wherein, if the detection unit detects that the secure chip is initialized, the control unit restarts the information processing apparatus.

5. The information processing apparatus according to claim 1,
    wherein, if the detection unit detects that the secure chip is initialized, the control unit makes the secure chip unavailable from the information processing apparatus.

6. The information processing apparatus according to claim 5,
    wherein, if the detection unit detects that the secure chip is initialized, the control unit transmits a command to deactivate the secure chip to the secure chip to make the secure chip unavailable from the information processing apparatus.

7. The information processing apparatus according to claim 5,
    wherein, if the detection unit detects that the secure chip is initialized, the control unit restricts access to the secure chip to make the secure chip unavailable from the information processing apparatus.

8. The information processing apparatus according to claim 1,
    wherein, if the detection unit detects that the secure chip is initialized, the control unit registers a random number in the secure chip.

9. A method of controlling an information processing apparatus holding a secure chip in which a hash value is capable of being registered, the method comprising:
    determining whether the information processing apparatus returns from an idle state;
    detecting, if the determining determines that the information processing apparatus returns from the idle state, initialization of the secure chip before starting application software; and
    if detection of the initialization of the secure chip is done and restart of the information processing apparatus is not permitted, registering a constant indicating that a platform configuration register (PCR) has an initial value in system return in the secure chip, and if determination that the information processing apparatus returns from an idle state is not done, controlling an operation of the information processing apparatus so that the hash value of the application software is registered in the secure chip.

10. A non-transitory storage medium storing a program that when executed causes an information processing apparatus to perform a process, the information processing apparatus holding a secure chip in which a hash value is capable of being registered, the process comprising:
    determining whether the information processing apparatus returns from an idle state;
    detecting, if the determining determines that the information processing apparatus returns from the idle state, initialization of the secure chip before starting application software; and
    if detection of the initialization of the secure chip is done and restart of the information processing apparatus is not permitted, registering a constant indicating that a platform configuration register (PCR) has an initial value in system return in the secure chip, and if determination that the information processing apparatus returns from an idle state is not done, controlling an operation of the information processing apparatus so that the hash value of the application software is registered in the secure chip.

* * * * *